United States Patent
Tzou et al.

(10) Patent No.: US 8,536,283 B2
(45) Date of Patent: Sep. 17, 2013

(54) VARNISH COMPOSITION WITH HIGH GLASS TRANSITION TEMPERATURE FOR GLASS FIBER LAMINATE

(75) Inventors: Ming-Jen Tzou, Taipei (TW); Chi-Cheng Chen, Taipei (TW); Mei-Ling Chen, Taipei (TW)

(73) Assignee: Nan Ya Plastics Corporation, Taipei (TW)

( * ) Notice: Subject to any disclaimer, the term of this patent is extended or adjusted under 35 U.S.C. 154(b) by 334 days.

(21) Appl. No.: 13/034,896

(22) Filed: Feb. 25, 2011

(65) Prior Publication Data
US 2011/0306725 A1 Dec. 15, 2011

(30) Foreign Application Priority Data
Jun. 14, 2010 (TW) ................................ 99119257 A

(51) Int. Cl.
*C08L 61/14* (2006.01)
*C08K 5/5313* (2006.01)

(52) U.S. Cl.
USPC .......................................... 525/504; 524/595

(58) Field of Classification Search
None
See application file for complete search history.

(56) References Cited

U.S. PATENT DOCUMENTS

| | | | |
|---|---|---|---|
| 6,376,080 B1 * | 4/2002 | Gallo | 428/413 |
| 2007/0141426 A1 * | 6/2007 | Choi et al. | 429/33 |
| 2008/0045688 A1 * | 2/2008 | Lin et al. | 528/162 |
| 2008/0132629 A1 * | 6/2008 | Tzou | 524/413 |
| 2010/0248570 A1 * | 9/2010 | Chen | 442/175 |
| 2011/0045303 A1 * | 2/2011 | He et al. | 428/418 |
| 2011/0097587 A1 * | 4/2011 | Chen | 428/417 |

OTHER PUBLICATIONS

Derwent accession No. 2010-C9944 for Chinese Patent No. 101643570 A1, Feb. 10, 2010, equivalent to U.S. Publication No. 20110045303, three pages.*
Kano et al., "Synthesis and thermal cure of high molecular weight polybenzoxazine precursors and the properties of the thermosets," vol. 46, 2005, pp. 12172-12180.*
Kano et al., "Preparation of Symmetric Polybenzoxazine Precursors and the Polymers Therefrom," Polymer Preprints, Japan, vol. 54, No. 1, 2005, one page.*

* cited by examiner

*Primary Examiner* — Robert Sellers
(74) *Attorney, Agent, or Firm* — Rosenberg, Klein & Lee

(57) ABSTRACT

A varnish composition includes (1) a benzoxazine resin having highly symmetric molecular structure; (2) at least one of naphthol novolac resins, aniline novolac resins and phenolic novolac resins; (3) fillers. The benzoxazine resin having highly symmetric molecular structure, and the at least one of naphthol novolac resins, aniline novolac resins and phenolic novolac resins contribute to increase the glass transition temperature of the varnish composition, while decrease the coefficient of thermal expansion and moisture absorbability due to their small and highly symmetric molecular structures. A copper substrate can meet the requirement of high glass transition temperature (TMA≧200° C.) and low coefficient of thermal expansion ($\alpha 1/\alpha \leqq 30/135$ (μm/m° C.). Therefore, the composition of the invention can be widely used as high-performance electronic material.

4 Claims, No Drawings

VARNISH COMPOSITION WITH HIGH GLASS TRANSITION TEMPERATURE FOR GLASS FIBER LAMINATE

BACKGROUND OF THE INVENTION

1. Field of the Invention

The present invention relates to a novel varnish composition. During manufacturing a glass fiber laminate, a glass fiber cloth is dipped within a novel varnish composition, solvent removal by oven, and then dried to obtain a glass fiber prepreg. The obtained prepreg is laminated onto a copper foil to obtain a novel glass fiber laminate which has high glass transition temperature, good flame retardance, good heat resistance, and low coefficient of thermal expansion, and therefore is suitable for high-performance printed circuit boards.

2. Description of Related Art

A commercially available dual-functional is a brominated epoxy resin which is a mature product and has been used for long time. The long-term modified physical properties of the brominated epoxy resin grant a glass fiber laminate made of the brominated epoxy resin good mechanical properties, electrical properties, physical properties and dimensional stability. Such a modified brominated epoxy resin has great adhesion to glass fiber or copper foil. Therefore, glass fiber laminates made of brominated epoxy resin can be widely used in electronics and aviation industry. However, halogen in high temperature breaks down harmful substances which are harmful to our living environment and human health. Halide-containing substrates have been gradually inhibited for use. European Unit announced to implement related protection regulations such as Directive on the Waste Electronics and Electrical Equipment (referred to as WEEE), and Directive on the Restriction of the Use of Certain Hazardous Substances in Electrical and Electronic Equipment (referred to as RoHS) in 2006. Another aspect in the lead-free manufacturing process, a welding process for lead-free packaging and assembly needs a higher temperature (an increase from 220° C. to 260° C.). The glass fiber laminates made of the existing dual-functional brominated epoxy resin cannot meet the requirements. Currently, multi-functional phenolic epoxy or phenolic novolac resin is used to achieve the required glass transition temperature and heat resistance for the lead-free manufacturing process. In a halogen-free substrate, a significant proportion of a polymer of 9,10-dihydro-9-oxa-10-phosphaphenanthrene-10-oxide (referred to as DOPO) and phenol phenolic epoxy resin, or a polymer of DOPO and o-cresol phenolic epoxy resin is used along with dicyandiamide (referred to as Dicy) resin curing agent or multi-functional phenolic resin curing agent such as phenol novolac resin in order to increase the glass transition temperature (referred to as Tg) and heat resistance.

Physical properties of a printed circuit board are mainly determined by three major materials of the glass laminate combination: (1) epoxy (2) filling material and (3) reinforcing material. The development of the substrate continuously requires increasing the glass transition temperature (Tg), the temperature of heat resistance, while decreasing coefficient of thermal expansion (referred to as CTE). For the properties of epoxy resin systems, multi-functional phenolic epoxy resins are commonly used to modify the substrate properties. The multi-functional phenolic epoxy resin is, for example, tetraphenyl ethane phenolic epoxy resin made by Nan Ya Plastics company (trade name NPPN-431). The FR-4 substrate composed by NPPN-431, a phenol curing agent and a glass fiber cloth (grade E glass), the glass transition temperature is 180° C. (according to thermal mechanical analysis) and the heat resistance is above 10 minutes (solder oven at 288° C.). The physical properties of the multi-functional phenolic epoxy resin based laminates are gradually unable to meet the requirements of higher-performance boards.

Therefore, there is a need of a novel varnish composition which overcomes the above disadvantages.

SUMMARY OF THE INVENTION

The application of printed circuit board follows the development trend of light, thin, short, small characteristics. In order to comply with this trend, a glass fiber laminate must have higher glass transition temperature, low coefficient of thermal expansion and good heat resistance. In some specific fields, integrated circuit substrates of new generation need higher requirements such as higher glass transition temperature (Tg), lower coefficient of thermal expansion and better heat resistance. Unfortunately, most of commercially available multi-functional phenolic epoxy resins cannot be applicable. Moreover, major impact of environmental regulations on the printed circuit board industry is the inhibition to the use of lead and halogen. Conversion of lead-free processes forces the temperature for assembly to rise. Increase in temperature brings a harsh challenge to material reliability. The halogen-free conversion results in the decrease in glass transition temperature (Tg) while increase in water absorption rate for the glass substrates, both challenging the material reliability as well. The increase in water absorption rate definitely deteriorates the heat resistance of the substrates. Therefore how to increase the glass transition temperature and decrease the water absorption rate for the halogen-free substrate becomes a critical issue to overcome for those skilled in the art.

In order to achieve the aforementioned objects, according to an embodiment of the present invention, a resin varnish composition with high glass transition temperature includes (1) a benzoxazine resin having highly symmetric molecular structure; (2) at least one of naphthol novolac resins, aniline novolac resins and phenolic novolac resins; (3) fillers; and suitable flame retardant agents, curing accelerators, and solvents. The benzoxazine resin is a novel benzoxazine resin having a highly symmetric molecular structure and high proportion of tri-functional resin monomer or tetra-functional resin monomer.

The used of the novel resin varnish composition containing the benzoxazine resin in producing the glass fiber laminate effectively reduces the coefficient of thermal expansion while increase the glass transition temperature for the glass fiber laminate, which meets the requirement of light, thin, short, small characteristics for high-end products. Without changing procedures of the impregnating and laminating processes, the manufacturing conditions for the glass fiber laminate and downstream process of producing circuit boards, the glass fiber laminates can be made efficiently in mass using the current processing equipment and current manufacturing conditions.

In order to further the understanding regarding the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended tables.

According to the invention, a varnish composition with high glass transition temperature which can be applied to a glass fiber laminate includes (1) benzoxazine resin having a highly symmetric molecular structure; and (2) curing agent such as at least one of naphthol novolac resins (for example, tetra-functional naphthol novolac resin, tri-functional naphthol novolac resin, or di-functional naphthol), aniline novolac resins and phenolic novolac resins. (3) Fillers can be included as well. Some suitable flame retardant agents, curing accelerators, and solvents can be included as needed. The amount of (1) benzoxazine resin based on the total amount of (1) benzoxazine resin and (2) curing agent is in the range of 60-95 wt %. The amount of (2) curing agent based on the total amount of (1) benzoxazine resin and (2) curing agent is in the range of 5-40 wt %.

The benzoxazine resin is characterized in that it has high proportion of tri-functional resin monomer or high proportion of tetra-functional resin monomer, a small molecular structure and a highly structural symmetry. Therefore, the glass fiber laminate made of benzoxazine resin has advantageous properties which suit the application for integrated circuit substrates, such as high glass transition temperature (Tg), low coefficient of thermal expansion (CTE), and good heat resistance and stability.

The benzoxazine resin can be obtained by the following steps.

Step 1. A phenolic hydroxyl aromatic aldehyde compound (A), such as para-hydroxybenzaldehyde, 2,6-Dimethyl-4-hydroxybenzaldehyde or salicylaldehyde, reacts with a phenol compound (B) such as phenol or m-cresol to obtain a phenolic novolac resin (C) having highly structural symmetry and high proportion of tri-functional resin monomer.

Step 2. A aldehyde compound (A) such as glyoxal or terephthalaldehyde reacts with a phenol compound (B) such as phenol or m-cresol to obtain a phenolic novolac resin (D) having highly structural symmetry and high proportion of tetra-functional resin monomer.

Step 3. The phenolic novolac resin (C) having high proportion of tri-functional resin monomer, formaldehyde and a primary amine compound (E) such as aniline, p-toluidine, 3,5-dimethyl aniline are subject to dehydration and heterocyclic ring formation to obtain a benzoxazine resin (F1) as a specific example of the (1) benzoxazine recited in the invention.

Step. 4. The phenolic novolac resin (D) having high proportion of tetra-functional resin monomer, formaldehyde and a primary amine compound (E) such as aniline, p-toluidine or 3,5-dimethylaniline are subject to dehydration and heterocyclic ring formation to obtain benzoxazine resin (F2) as another specific example of the (1) benzoxazine recited in the invention.

The formation of phenolic novolac resin (C) having high proportion of tri-functional resin monomer includes the following steps.

8 to 20 weight percent (wt %) of aldehyde compounds such as para-hydroxybenzaldehyde, and 80 to 95 weight percent (wt %) of phenolic compounds such as phenol, with phenol/para-hydroxybenzaldehyde mole ratio being 10 to 20, are mixed and dissolved at 60~100° C., and then subject to condensation reaction in the presence of an acidic catalyst (such as methyl sulfonic acid, p-toluenesulfonic acid, boron trifluoride or aluminum chloride) for 3 to 4 hours to obtain having a phenolic resin having high proportion of tri-functional resin monomer. By means of analytic patterns of gel permeation chromatography (referred to as GPC), the proportion of the tri-functional resin monomer is greater than 70 area percent (Area %), the remaining 30 area percent (Area %) being phenolic resins having 1~4 resin repeating units. Tri-functional resin monomer structure is as follows

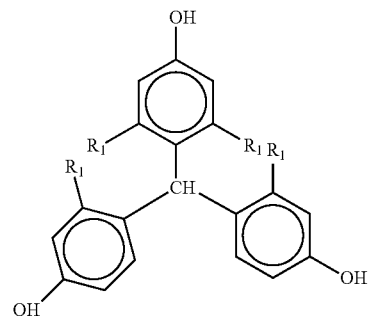

Wherein R1 can be H or CH3.

The formation of the phenolic novolac resin (D) having high proportion of tetra-functional resin monomer includes the following steps.

5 to 20 weight percent (wt %) of aldehyde compounds such as glyoxal, and 80 to 95 weight percent (wt %) of phenolic compounds such as phenol, with phenol/glyoxal mole ratio being 10 to 30, are mixed and dissolved at 60~100° C., and then subject to condensation reaction in the presence of an acidic catalyst (such as methyl sulfonic acid, p-toluenesulfonic acid, boron trifluoride or aluminum chloride) for 3 to 5 hours to obtain having a phenolic resin having high proportion of tetra-functional resin monomer. By means of analytic patterns of gel permeation chromatography (referred to as GPC), the proportion of the tetra-functional resin monomer is greater than 70 area percent (Area %), the remaining 30 area percent (Area %) being phenolic resins having 1~4 resin repeating units. Tetra-functional resin monomer structure is as follows

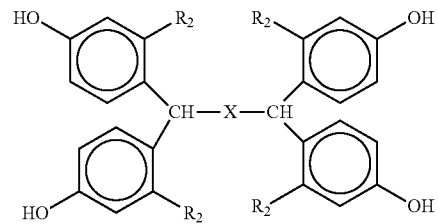

Wherein R2 can be H or CH3;

X can be

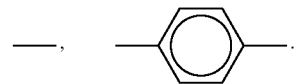

The formation of the benzoxazine resin (F1) having high proportion of tri-functional resin monomer includes the following steps.

The phenolic resin (C) having high proportion of tri-functional resin monomer, formaldehyde, aniline compounds such as aniline, and a solvent such as propylene glycol monomethyl ether (referred to as PM), with mole ratio of 1:2.1:1 are subject to heterocyclic condensation at 70 to 100° C. to obtain benzoxazine resin (F1). According to analytic patterns of gel permeation chromatography (GPC), the proportion of tri-functional resin monomer in the obtained product is more than 60 area percent (Area %).

The tri-functional resin monomer of the phenolic resin (C) have the following structure:

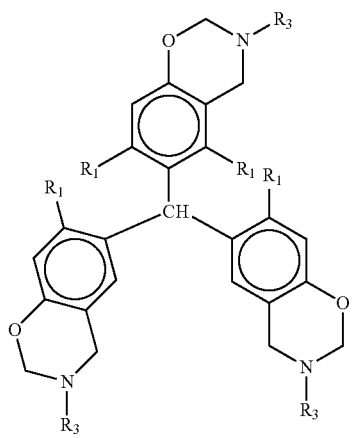

R1 can be H or CH3;
R3 can be

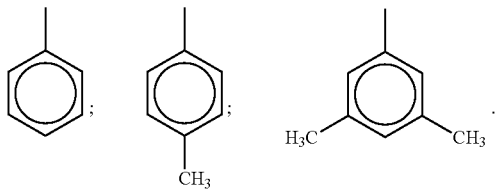

The formation of the benzoxazine resin (F2) having high proportion of tetra-functional resin monomer includes the following steps.

The phenolic novolac resin (D) having high proportion of tetra-functional resin monomer, formaldehyde, aniline compounds such as aniline, and a solvent such as propylene glycol monomethyl ether, with mole ratio of 1:2.1:1 are subject to heterocyclic condensation at 70 to 100° C. to obtain a benzoxazine resin (F2). According to analytic patterns of the gel permeation chromatography (GPC), the proportion of tetra-functional resin monomer in the obtained product is more than 60 area percent (Area %).

The tetra-functional resin monomer of the phenolic novolac resin (D) have the following structure.

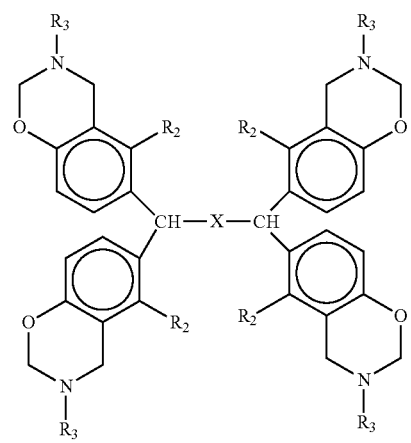

R2 can be H or CH3;
R3 can be

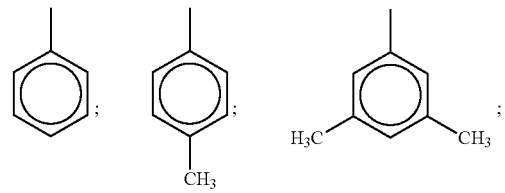

and
X can be

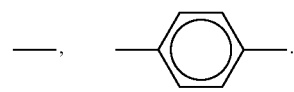

The formation of the phenolic resin (C) having high proportion of tri-functional resin monomer is achieved by the following steps.

The steps include: in a 2 L four-necked glass reactor equipped with a heating mantle, a temperature controller, an electric mixer and a condenser are poured 274.5 g of para-hydroxybenzaldehyde and 3172.5 g of phenol, and then mixed and dissolved at 60° C.; after adding 43.2 g methyl sulfonic acid catalyst, the temperature is raised up to 70° C. for further 3-hour reaction; after sodium hydroxide (referred to as NaOH) is added to neutralize for phenol removal in vacuum, a solvent methyl isobutyl ketone (referred to as MIBK) and water are added to wash off; and then, the solvent methyl isobutyl ketone (MIBK) is removed in vacuum to obtain a phenolic resin (C) having high proportion of tri-functional resin monomer.

In the formation of the above resin (C), the aldehyde compounds are generally para-hydroxybenzaldehyde, 2,6-dimethyl-4-hydroxy benzaldehyde or salicylaldehyde etc. Para-hydroxybenzaldehyde is preferably used.

The phenolic compounds, generally, are phenol or m-cresol, etc. Phenol is preferably used.

The formation of the phenolic novolac resin (D) having high proportion of tetra-functional resin monomer is achieved by the following steps.

The steps include: in a 2 L four-necked glass reactor equipped with a heating mantle, a temperature controller, an electric mixer and a condenser are poured 135 g of glyoxal (40 wt % aqueous solution) and 2188 g of phenol, and then mixed and dissolved at 70° C.; after adding 3 g methyl sulfonic acid catalyst, the temperature is raised up to 98° C. for further 3.5-hour reaction; after sodium hydroxide (NaOH) is added to neutralize for phenol removal in vacuum, a solvent methyl isobutyl ketone (MIBK) and water are added to wash off; and then, the solvent methyl isobutyl ketone (MIBK) is removed in vacuum to obtain a phenolic novolac resin (D) having high proportion of tetra-functional resin monomer.

In the formation of the above resin (D), the aldehyde compounds are generally glyoxal or terephthalaldehyde. Glyoxal is preferably used.

The phenolic compounds, generally, are phenol or m-cresol, etc. Phenol is preferably used.

The formation of the benzoxazine resin (F1) having high proportion of tri-functional resin monomer is achieved by the following steps.

The steps include: in a 2 L four-necked glass reactor equipped with a heating mantle, a temperature controller, an electric mixer and a condenser, 350 g of phenolic resin (C) having high proportion of tri-functional resin monomer and 246 g of paraformaldehyde are dissolved thoroughly in the presence of 816 g of a solvent propylene glycol monomethyl ether at 85° C., 334.4 g of aniline is dropped in the course of 3 hours into the reactor at constant speed by a quantitative pump to proceed the reaction at 85° C. After finishing the dropping addition of aniline, the temperature is kept at 85° C. for aging for 2 hours, then the temperature is raised to 105° C. After water and part of the solvent are removed, a benzoxazine resin solution with 56 wt % solid is obtained. According to gel permeation chromatography (GPC) analysis, the proportion of the tri-functional resin monomer in this benzoxazine resin is up to 60 area percent (Area %) or more.

The formation of the benzoxazine resin (F2) having high proportion of tetra-functional resin monomer is achieved by the following steps.

The steps include: in a 2 L four-necked glass reactor equipped with a heating mantle, a temperature controller, an electric mixer and a condenser, 200 g of phenolic novolac resin (D) having high proportion of tetra-functional resin monomer and 124.5 g of paraformaldehyde are dissolved thoroughly in the presence of 816 g of a solvent propylene glycol monomethyl ether at 85° C., 169 g of aniline is dropped in the course of 3 hours into the reactor at constant speed by a quantitative pump to proceed the reaction at 85° C. After finishing the dropping addition of aniline, the temperature is kept at 85° C. for aging for 2 hours, then the temperature is raised to 105° C. After water and part of the solvent are removed, a benzoxazine resin solution with 56 wt % solid is obtained. According to gel permeation chromatography (GPC) analysis, the proportion of the tetra-functional resin monomer in this benzoxazine resin is up to 60 area percent (Area %) or more.

In the formation of the benzoxazine resins F1 and F2, the aldehyde compounds used in the preparation of symmetrical benzoxazine, paraformaldehyde is preferred. For amine compounds, primary amines are commonly used, and aniline is preferred.

In the resin varnish composition of the invention, the second component (2) is a curing agent, including (a) naphthol novolac resin, such as tetra-functional naphthol novolac resin by synthesis of 2,7-dihydroxynaphthalene and formaldehyde, tri-functional naphthol novolac resin by synthesis of 2,7-dihydroxynaphthalene, β-naphthol and formaldehyde, and di-functional naphthol; (b) aniline novolac resin (referred to as AN), such as aniline novolac resin by the synthesis of aniline and formaldehyde, or 4,4-diamino diphenyl methane (referred to as DDM), etc.; and (c) phenol novolac resin, such as phenolic novolac resin (referred to as PN) by the synthesis of phenol and formaldehyde, amino triazine novolac resin (referred to as ATN), bisphenol-A novolac resin (referred to as BN) and tetraphenyl ethane novolac resin (referred to as TPE).

When the above second component is used as the curing agent, the dry weight ratio of the curing agent and benzoxazine resin is in the range of 0.05 to 0.5, and the most preferred ratio is 0.1 to 0.3.

In the resin varnish composition of the present invention the third component is a filler, including silica, quartz powder, barium sulfate, and alumina, etc. Silica is preferred. The filler can be used alone or in mixture of two or more selected from above. The amount of the filler based on the total weight of the resin (benzoxazine resin (1)+curing agent (2)) is in the range of 80 to 200 phr, preferred ratio is 100 to 120 phr.

The resin varnish composition of the invention can further contain flame retardants including phosphorus-containing organic flame retardants, phosphorus resins. The phosphorus resins are DOPO (9,10-dihydro-9-oxa-10-phosphaphenanthrene-10-oxide), DOPO-hydroxyquinone (DOPO-HQ), etc.

The resin varnish composition of the invention can further contain a curing accelerator including tertiary phosphines, tertiary amines, quaternary phosphonium salts, quaternary ammoniums, imidazole compounds. The tertiary phosphines include triphenylphosphine, etc.; tertiary amines include trimethyl aniline, triethyl amine, tributyl amine, etc.; quaternary phosphonium salts include halide-containing quaternary phosphonium, such as tetrabutyl phosphonium bromide, tetraphenyl phosphonium bromide, ethyl triphenyl phosphonium bromide, etc.; quaternary ammoniums include halide-containing quaternary ammoniums, such as tetramethyl ammonium bromide, tetraethyl ammonium bromide, tetrabutyl ammonium bromide; imidazole compounds include 2-methyl imidazole, 2-ethyl imidazole, 2-ethyl-4-methyl imidazole, 2-ethyl-4-hydroxymethyl imidazole, etc. Among those recited above, 2-methyl-imidazole or 2-ethyl-4-methyl imidazole is preferred. The curing accelerator can be used alone or mixed with two or more simultaneously.

The resin varnish composition of the invention can further contain organic solvents including organic aromatic solvents, aprotic solvents, ketone solvents, ether solvents and ester solvents. Examples of appropriate solvent include N,N-dimethyl formamide, acetone, methyl ethyl ketone, propylene glycol monomethyl ether (PM) and so on. Main function of the organic solvent is to dissolve the benzoxazine resin and curing agent to achieve uniform mixing and adjust the viscosity of the resin varnish composition for easy production of glass fiber laminates.

Specific procedures of making glass fiber laminates by using the above composition of this invention include the following steps.

Step 1: Preparation of benzoxazine resin varnish composition. The component (1) is benzoxazine having novel, highly symmetrically structural characteristics. The amount of component (1), the benzoxazine resin, relative to the sum of the component (1) and the component (2) is between 60 and 95 wt %. The amount of the component (2), the curing agent, relative to the sum of the component (1) and the component (2) is 5 to 40 wt %. The amount of the component (3), the filler, relative to the sum of the component (1) and the component (2) is 80 to 200 phr; the amount of the flame retardant relative to the sum of the component (1) and the component (2) is 0 to 30 phr; the curing accelerator relative to the component (1) is 0.01 to 1 phr; and the organic solvent relative to the sum of the component (1) and the component (2) is 30 to 60 phr. The components (1), (2), (3), the fire resistant agent, the curing accelerator and the organic solvent are then mixed thoroughly to complete the preparation of varnish composition.

Step 2: Preparation of a prepreg. A glass fiber cloth is impregnated in the resin varnish composition obtained at step (1) for 1 to 3 minutes. Then the resin-impregnated glass fiber cloth is placed into a heat oven at 170° C. for 2 to 5 minutes. After removal of the organic solvent, the glass fiber cloth is taken out of the oven, stays aside for cooling to obtain a prepreg.

Step 3: Hot press of glass laminates. A plurality of prepregs are stacked in layers in a manner that on one or both surfaces of the stack is placed a copper foil and then put into a thermal press to apply pressure and heat over the stack for curing so as to obtain the glass fiber laminate having excellent properties.

The resin varnish composition of the invention can be cured at 100 to 300° C., preferably 150 to 210° C. If the curing temperature is too low, then the curing rate is too slow and therefore it needs to prolong the curing time, which do not meet the requirement of production efficiency. However, excessively high curing temperature tends to make resin cracking, disadvantageously deteriorating physical properties of the glass fiber laminate.

EXAMPLE

The following specific embodiments of the present invention describe the invention in details. Codes and its components used in Examples and Comparative Examples are as follows:

Resin F1: Benzoxazine having high proportion of tri-functional resin monomer according to this invention.

Resin F2: Benzoxazine having high proportion of tetra-functional resin monomer according to this invention.

Resin 1: Tetraphenyl ethane phenolic novolac epoxy resin manufactured by Nan Ya Plastics Corporation, trade name NPPN-431A70, epoxy equivalent of 200~220 g/eq; solid content of 69 to 71 weight percent.

Resin 2: Tetra-functional naphthalene epoxy resin manufactured by Dainippon ink company, trade name EXA-4700, epoxy equivalent of 150 to 170 g/eq.

Resin 3: Bisphenol-A typo benzoxazine resin made by Nan Ya Plastics Corporation, trade name NPEX-230.

Curing agent 1: Tetraphenyl ethane phenolic novolac resin manufactured by Nan Ya Plastics Corporation; trade name TPN.

Curing agent 2: Tri-functional naphthol resin made by Nan Ya Plastics Corporation, from 2,7-dihydroxynaphthalene, β-naphthol and aldehydes.

Curing agent 3: 4,4-diamino diphenyl methane (referred to as DDM), containing 14.1 wt % nitrogen.

Curing agent 4: amino triazine novolac resin, softening point of 80~85° C.; 5~20 wt % nitrogen.

Flame retardant 1: phosphorus-containing flame retardant manufactured by Otsuka Chemical Company, Japan; 13.4 wt % of phosphorus, trade name SPB-100.

Curing accelerator 1: 2-methyl imidazole (referred to as 2-MI) solution of 14.2 g of 2-methylimidazole (2MI) dissolved in 85.8 g N,N-dimethyl formamide (DMF).

Filler 1: silica ($SiO_2$)

Fiberglass cloth: glass fiber cloth 7628 (Level E glass) manufactured by Nan Ya Plastics Corporation.

Example 1

45.5 dry weight parts of benzoxazine resin F1 having symmetric structure and high proportion of tri-functional resin monomer, 4.5 dry weight parts of curing agent 1, 60 dry weight parts of filler 1 are formulated with an appropriate solvent by a well-known method of preparing glass fiber laminate to obtain a resin varnish composition having 50 wt % solids. The formula is detailed in Table (1). In the preparation method, one 7628 glass fiber cloth is impregnated with the above resin varnish composition, and then dried at 170° C. (oven temperature) for few minutes. By means of adjusting drying time, a prepreg having melt viscosity of 8000 to 12000 poises is obtained. Four prepregs are stacked in layers between two copper foils each of which has a thickness of 35 μm, and subject to thermal pressing under pressure of 30 kg/cm² to obtain the glass fiber laminate.

The temperature control procedures are as follows.

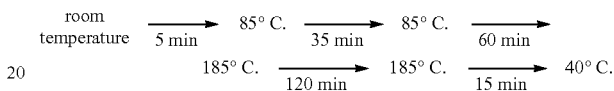

Example 2

45.5 dry weight parts of benzoxazine resin F1 having a symmetric structure and high proportion of tri-functional resin monomer, 4.5 dry weight parts of curing agent 2, 60 dry weight parts of filler 1 are used. The formula is detailed in Table 1. The procedures are same as in Example 1.

Example 3

45.5 dry weight parts of benzoxazine resin F1 having a symmetric structure and high proportion of tri-functional resin monomer, 4.5 dry weight parts of curing agent 3, 60 dry weight parts of filler 1 are used. The formula is detailed in Table 1. The procedures are same as in Example 1.

Example 4

45.5 dry weight parts of benzoxazine resin F1 having a symmetric structure and high proportion of tri-functional resin monomer, 4.5 dry weight parts of curing agent 4, 50 dry weight parts of filler 1 are used. The formula is detailed in Table 1. The procedures are same as in Example 1.

Example 5

45.5 dry weight parts of benzoxazine resin F2 having a symmetric structure and high proportion of tetra-functional resin monomer, 4.5 dry weight parts of curing agent 1, 60 dry weight parts of filler 1 are used. An appropriate solvent is used to obtain the resin varnish composition having 50 wt % solids. The formula is detailed in Table 1. In the preparation method, one 7628 glass fiber cloth is impregnated with the above resin varnish composition, and then dried at 170° C. (oven temperature) for few minutes. By means of adjusting drying time, a prepreg having melt viscosity of 8000 to 12000 poises is obtained. Four prepregs are stacked in layers between two copper foils each of which has a thickness of 35 μm, and subject to thermal pressing under pressure of 30 kg/cm² to obtain the glass fiber laminate.

The temperature control procedures are as follows

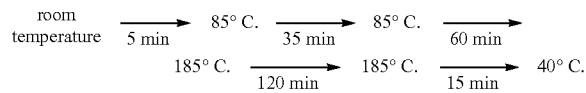

Example 6

45.5 dry weight parts of benzoxazine resin F2 having a symmetric structure and high proportion of tetra-functional resin monomer, 4.5 dry weight parts of curing agent 2, 60 dry weight parts of filler 1 are used. The formula is detailed in Table 1. The procedures are same as in Example 5.

Example 7

45.5 dry weight parts of benzoxazine resin F2 having a symmetric structure and high proportion of tetra-functional resin monomer, 4.5 dry weight parts of curing agent 3, 60 dry weight parts of filler 1 are used. The formula is detailed in Table 1. The procedures are same as in Example 5.

Example 8

45.5 dry weight parts of benzoxazine resin F2 having a symmetric structure and high proportion of tetra-functional resin monomer, 4.5 dry weight parts of curing agent 4, 50 dry weight parts of filler 1 are used. The formula is detailed in Table 1. The procedures are same as in Example 5.

Comparative Examples 1~3

The formula of the resin 1, the resin 2, the resin 3, the curing agent 1 and the curing agent 4 is detailed in Table 2. Acetone is used to adjust solids content to 65 wt % of the resin varnish composition. Glass fiber laminates are prepared in the same way with the implementation of Example 1.

Measurement

1. The glass transition temperature:
Using Thermal Mechanical Analyzer (referred to as TMA), heating rate=20° C./min, 30° C. to 300° C.

2. Coefficient of Thermal Expansion (Referred to as CTE)
Using Thermal Mechanical Analyzer (referred to as TMA), heating rate=20° C./min, 30° C. to 300° C.

3. Water Absorption Test:
A water absorption test method includes taking a glass fiber laminate having a copper foil thereon, removing the copper foil on the glass fiber laminate by using a ferric chloride solution; and then cutting into 5 cm×5 cm square specimens. The specimens are dried in an oven at 105° C. for 2 hr. Then, the specimens are placed inside a steam pressure cooker. The pressure cooker tester (referred to as PCT) conditions are 2 atm×120° C. After placed in the pressure cooker for 120 min, the weight differences of the specimens before and after placed in the pressure cooker are divided by the initial weights of the specimens to obtain the water absorption rate.

4. Heat Resistance Test:
After the 5 cm×5 cm square specimens of the glass laminates whose copper foils have been removed laminate are tested by the water absorption test, those specimens are placed in a solder furnace at 288° C. until the glass laminates delaminate.

5. Flame Resistance Test:
The Specimens are cut into 5 rectangular pieces of 0.5 in×4.7 in. 2 cm-high blue flames is used to burn for 10 seconds for each specimen and then removed. This flame burning repeats twice. Flame self-extinguishing time after removal of the flame for each burning is recorded. The total flame self-extinguishing time for each specimen is no more than 10 seconds. The sum of flame self-extinguishing time for all specimens is no more than 50 seconds, and at this moment it reaches 94V0.

TABLE 1

Formula of the resin varnish composition and physical properties of the glass fiber laminates (Examples).

| | | Example 1 | Example 2 | Example 3 | Example 4 | Example 5 | Example 6 | Example 7 | Example 8 |
|---|---|---|---|---|---|---|---|---|---|
| Components of resin varnish composition | 1. resinF1 (parts) | 45.5 | 45.5 | 45.5 | 45.5 | | | | |
| | 2. resinF2 (parts) | | | | | 45.5 | 45.5 | 45.5 | 45.5 |
| | 3. curing agent1 (parts) | 4.5 | | | | 4.5 | | | |
| | 4. curing agent2 (parts) | | 4.5 | | | | 4.5 | | |
| | 5. curing agent3 (parts) | | | 4.5 | | | | 4.5 | |
| | 6. curing agent4 (parts) | | | | 4.5 | | | | 4.5 |
| | 7. filler1 (parts) | 60 | 60 | 60 | 50 | 60 | 60 | 60 | 50 |
| | 8. flame retardant1 (parts) | 0.5 | 0.5 | 0.5 | 0 | 0.5 | 0.5 | 0.5 | 0 |
| | 9. curing accelerator1 (parts) | 0 | 0 | 0 | 0 | 0 | 0 | 0 | 0 |
| Physical [properties of glass fiber laminates | 1. glass transition temperature (° C.) (TMA) | 215 | 209 | 214 | 232 | 222 | 217 | 213 | 242 |
| | 2. heat resistance (288° C.) | 10 min ↑ | 10 min ↑ | 10 min ↑ | 10 min ↑ | 10 min ↑ | 10 min ↑ | 10 min ↑ | 10 min ↑ |
| | 3. Water Absorption Rate (wt %) (PCT: 2 hr * 120 min) | 0.23 | 0.21 | 0.3 | 0.18 | 0.286 | 0.29 | 0.26 | 0.26 |
| | 4. coefficient of thermal expansion (α1/α2) (μm/(m° C.)) | 25/110 | 21/130 | 16/135 | 33/139 | 25/118 | 22/136 | 24/122 | 28/121 |
| | 5. Flame Resistance | 94V0 pass | 94V0 pass | 94V0 pass | 94V0 pass | 94V0 pass | 94V0 pass | 94V0 pass | 94V0 pass |

Note:
the "parts" of Table 1 means "dry weight parts" which do not include solvent.

TABLE 2

Formula of the resin varnish composition and physical properties of the fiber laminates (Comparative Examples).

| | | Comparative Example1 | Comparative Example2 | Comparative Example3 |
|---|---|---|---|---|
| Components of resin of composition | 1. resin1 (parts) | 36 | | |
| | 2. resin2 (parts) | | 36 | |
| | 3. resin3 (parts) | | | 36 |
| | 4. curing agent1 (parts) | 4 | | 4 |
| | 5. curing agent4 (parts) | | 4 | |
| | 6. filler1 (parts) | 60 | 60 | 60 |
| | 7. flame retardant1 (parts) | 1.2 | 1.2 | 0.5 |
| | 8. curing accelerator1 (parts) | 0.01 | 0.04 | 0 |
| Physical properties of lass fiber laminate | 1. glass transition temperature (° C.) (TMA) | 187 | 200 | 178.4 |
| | 2. heat resistance (288° C.) | 8 min ↑ | 8 min ↑ | 8 min ↑ |
| | 3. Water Absorption Rate (wt %) (PCT: 2 hr*120 min) | 0.56 | 0.49 | 0.21 |
| | 4. coefficient of thermal expansion($\alpha1/\alpha2$) ($\mu$m)(m ° C.)) | 30/112 | 30/90 | 20/116 |
| | 5. Flame Resistance | 94V0 pass | 94V0 pass | 94V0 pass |

Note:
the "parts" of Table 2 means "dry weight parts" which do not include solvent.

Comparing with the glass fiber laminates made of tetra-functional Tetraphenyl ethane phenolic novolac epoxy resin or tetra-functional naphthalene epoxy resin, the glass fiber laminates made of Benzoxazine having high proportion of tri-functional resin monomer and Benzoxazine having high proportion of tetra-functional resin monomer has better physical properties, for example, the glass transition temperature increases from 187-200° C. to above 213° C., the water absorption rate decreases from about 0.5 wt % to lower than 0.3 wt %, and the heat resistance and coefficient of thermal expansion are improved. Thus, the manufactured glass fiber laminates are suitable for substrates of high performance integral circuit.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A resin varnish composition with high glass transition temperature and able to apply to a glass fiber laminate, comprising: (1) 60-95 wt % of benzoxazine resin having highly symmetric molecular structure, based on the total resin weight of the resin varnish composition; and (2) 5-40 wt % of curing agent, based on total resin weight of the resin varnish composition, wherein (1) benzoxazine resin comprises a benzoxazine resin (F1) having tri-functional resin monomer or a benzoxazine resin (F2) having tetra-functional resin monomer; the benzoxazine resin (F1) has the following structure

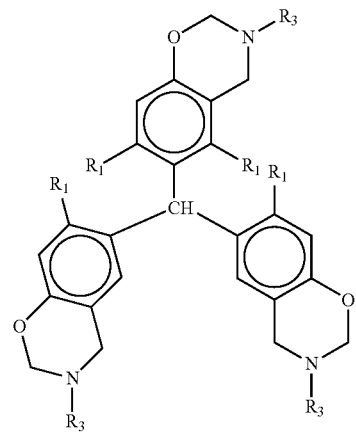

and the benzoxazine resin (F2) has the following structure

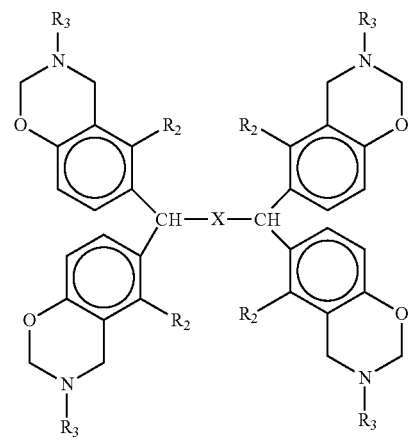

wherein R1 and R2 are H or CH3;
R3 is

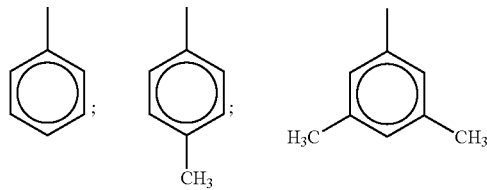

X is

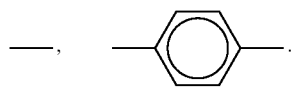

2. The resin varnish composition of claim 1, further comprising (3) filler; flame retardant, curing accelerator and organic solvent, the amount of (3) filler relative to the total sum of (1) benzoxazine resin and (2) curing agent is from 80 to 200 phr.

3. The resin varnish composition of claim 1,
wherein according to analytic patterns of gel permeation chromatography (GPC), the proportion of tri-functional resin monomer in the benzoxazine resin (F1) is more than 60 area percent (Area %), and the proportion of tetra-functional resin monomer in the benzoxazine resin (F2) is more than 60 area percent (Area %).

4. The resin varnish composition of claim 1, wherein (2) curing agent comprises (a) naphthol novolac resin, including tetra-functional naphthol novolac resin, tri-functional naphthol novolac resin, or di-functional naphthol; (b) aniline novolac resin or 4,4-diamino diphenyl methane; and (c) phenol novolac resin, including tetraphenyl ethane novolac resin, amino triazine novolac resin, bisphenol-A novolac resin or triphenyl methane novolac resin.

* * * * *